United States Patent
Kobayashi et al.

(10) Patent No.: US 11,168,166 B2
(45) Date of Patent: Nov. 9, 2021

(54) MULTI-COMPONENT POLAR OLEFIN COPOLYMER AND METHOD FOR PRODUCING THE SAME

(71) Applicants: Japan Polyethylene Corporation, Tokyo (JP); Japan Polypropylene Corporation, Tokyo (JP)

(72) Inventors: Minoru Kobayashi, Mie (JP); Tomohiko Satou, Mie (JP); Masahiro Uematsu, Kanagawa (JP); Yoshika Yamada, Mie (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 180 days.

(21) Appl. No.: 16/497,556

(22) PCT Filed: Mar. 28, 2018

(86) PCT No.: PCT/JP2018/013056
§ 371 (c)(1),
(2) Date: Sep. 25, 2019

(87) PCT Pub. No.: WO2018/181623
PCT Pub. Date: Oct. 4, 2018

(65) Prior Publication Data
US 2020/0385502 A1 Dec. 10, 2020

(30) Foreign Application Priority Data
Mar. 28, 2017 (JP) .............................. JP2017-062302

(51) Int. Cl.
C08F 210/02 (2006.01)
C08F 222/10 (2006.01)
C08F 222/02 (2006.01)

(52) U.S. Cl.
CPC .......... *C08F 222/02* (2013.01); *C08F 210/02* (2013.01); *C08F 222/10* (2013.01); *C08F 222/102* (2020.02); *C08F 2410/04* (2013.01)

(58) Field of Classification Search
CPC .... C08F 210/02; C08F 210/04; C08F 210/06; C08F 210/08; C08F 210/10; C08F 210/14; C08F 220/12; C08F 220/14; C08F 220/16; C08F 222/102
See application file for complete search history.

(56) References Cited

U.S. PATENT DOCUMENTS

| | | | |
|---|---|---|---|
| 2009/0221757 A1* | 9/2009 | Coca | C08F 289/00 525/263 |
| 2009/0253878 A1 | 10/2009 | Ye et al. | |
| 2011/0257351 A1 | 10/2011 | Kobayashi et al. | |
| 2015/0197590 A1 | 7/2015 | Osby | |

FOREIGN PATENT DOCUMENTS

| | | | |
|---|---|---|---|
| CN | 103951777 A | * | 7/2014 |
| JP | S51-116891 A | | 10/1976 |
| JP | S62-059658 A | | 3/1987 |
| JP | 3-229713 | | 10/1991 |
| JP | 6-184214 | | 7/1994 |
| JP | 2-792982 | | 6/1998 |
| JP | 2792982 | | 6/1998 |
| JP | 2002-521534 | | 7/2002 |
| JP | 2008-223011 | | 9/2008 |
| JP | 2010-120991 | | 6/2010 |
| JP | 2010-150246 | | 7/2010 |
| JP | 2010-150532 | | 7/2010 |
| JP | 2010-202647 | | 9/2010 |
| JP | 2011-075705 A | | 4/2011 |
| WO | 2010/058849 | | 5/2010 |

OTHER PUBLICATIONS

Thomas Rünzi et al., "Reactivity of Methacrylates in Insertion Polymerization", J. Am. Chem. Soc., vol. 132, No. 46, 2010, pp. 16623-16630.
Jianli Wang et al., "One-Pot Synthesis of Hyperbranched Polyethylenes Tethered with Polymerizable Methacryloyl Groups via Selective Ethylene Copolymerization with Heterobifunctional Comonomers by Chain Walking Pd-Diimine Catalysis", Macromolecules, vol. 41, No. 6, 2008, pp. 2290-2293.
ISR issued in International Patent Application No. PCT/JP2018/013056, dated May 29, 2018 w/ Eng. translation.
Written Opinion of the International Searching Authority issued in International Application No. PCT/JP2018/013056, dated May 29, 2018.
IPRP issued in International Patent Application No. PCT/JP2018/013056, dated Oct. 1, 2019 w/ Eng. translation.
Extended European Search Report, European Patent Office, Application No. 18777731.3, dated Mar. 17, 2020.

(Continued)

*Primary Examiner* — Richard A Huhn
(74) *Attorney, Agent, or Firm* — Greenblum & Bernstein, P.L.C.

(57) ABSTRACT

An object of the present invention is to provide a multi-component polar olefin copolymer which has sufficiently improved solvent solubility without impairing mechanical properties and the like. The present invention relates to a multi-component polar olefin copolymer containing: one kind of unit of nonpolar monomer (X1) that is ethylene or an α-olefin having 3 to 10 carbon atoms; one or two or more kinds of units of polar monomers (formula (1), Z1); and structural unit(s) of one or two or more kinds of units of nonpolar monomers (X2) that are different from the above X1 and/or one or two or more kinds of units of polar monomers (formula (2), Z2):

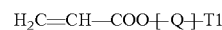

(1)

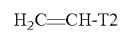

(2).

6 Claims, No Drawings

(56) References Cited

OTHER PUBLICATIONS

Office Action issued in Japanese Patent Application No. 2018-062755, dated May 25, 2021, English translations.
Office Action issued in Chinese Patent Application No. 201880021258.6, dated Aug. 18, 2021, English translation.

* cited by examiner

MULTI-COMPONENT POLAR OLEFIN COPOLYMER AND METHOD FOR PRODUCING THE SAME

TECHNICAL FIELD

The present invention relates to a multi-component polar olefin copolymer and a method for producing the same. More specifically, the present invention relates to a multi-component polar olefin copolymer having a polymerizable functional group, which is obtained by polymerization using a polar comonomer having a specific structure and has a linear polymer primary structure.

BACKGROUND ART

Among resin materials, olefin-based polymers such as ethylene polymers and copolymers of ethylene with $\alpha$-olefins are excellent in various properties such as physical properties and moldability and exhibit high economic efficiency and high adaptability to environmental problems, so that the polymers are highly versatile and important industrial materials.

However, since the olefin-based polymers do not have a polar group, it has been difficult to apply to uses that require physical properties such as adhesiveness to other materials, printability, or compatibility with a filler or the like. As a material to improve the properties, a copolymer of ethylene with a polar-group-containing vinyl monomer produced by a high pressure radical polymerization process has been used alone or as a composition with another resin (Patent Literatures 1 and 2). However, due to the polymer multi-branched structure, it is low elastic modulus and inferior in mechanical properties, and thus, not only when it is used alone but also when it is used as a composition with another resin, the scope of application to uses that require particularly high strength has been limited.

On the other hand, an olefin-based polymer having a polymerizable functional group as a polar group is expected to be a material that can be strengthened by post-modification or post-crosslinking while maintaining molding characteristics. Hitherto, although copolymers having an olefin with different reactivity such as an exo-methylene group have been reported, it has been considered difficult to produce an olefin-based polymer having a methacrylate, which is a polymerizable functional group having polarity, at a side chain.

In recent years, attempts have been reported to overcome these problems by using a late-periodic transition metal catalyst resistant to polar functional groups (Patent Literatures 3 to 8). Non-Patent Literature 1 reports that a linear copolymer having a methacrylate at a side chain is obtained by using a palladium compound as a polymerization catalyst.

CITATION LIST

Patent Literature

Patent Literature 1: Japanese Patent No. 2792982
Patent Literature 2: JP-A-3-229713
Patent Literature 3: JP-T-2002-521534
Patent Literature 4: JP-A-6-184214
Patent Literature 5: JP-A-2008-223011
Patent Literature 6: JP-A-2010-150246
Patent Literature 7: JP-A-2010-150532
Patent Literature 8: JP-A-2010-202647

Non-Patent Literature

Non-Patent Literature 1: Thomas Runzi, Damien Guironnet, Inigo Gottker-Schnetmann, and Stefan Mecking J. Am. Chem. Soc., 2010. 132 (46), pp 16623-16630.

SUMMARY OF INVENTION

Technical Problem

However, as a result of evaluation done by the inventors of the present application, the conventional olefin copolymers having a polymerizable functional group are insufficient in solubility in various solvents and monomers (see Comparative Examples of the present application), and it is difficult to exhibit performance in the case of blending. In consideration of these conventional techniques, it is obvious that there is desired development of a polar-group-containing olefin copolymer which is produced by a simple and efficient polymerization method and whose solvent solubility is sufficiently improved without impairing mechanical properties and other physical properties.

An object of the present invention is to provide a multi-component polar olefin copolymer whose solvent solubility is sufficiently improved without impairing mechanical properties and other physical properties and a method for producing the same.

Solution to Problem

In order to solve the problems for the present invention as described above, in the production of a multi-component polar olefin copolymer, the present inventors have aimed at production of the copolymer by a simple and efficient production method, and various inspections and searches have been made for the method of introducing a polar group and the selection of polymerization catalysts, polar monomers, multi-component monomers, and the like.

As a result, they have found that a multi-component polar olefin copolymer where an acrylate compound having a specific substituent is selected as a comonomer component solves the above problems, and thus they have accomplished the invention.

Moreover, they have also found that the above olefin-based polymer is easily obtained by using a complex having a specific structure as a polymerization catalyst, and have also devised the invention of a production method. Based on these achievements, the following inventions are provided.

[1] A multi-component polar olefin copolymer comprising: one kind of unit of nonpolar monomer (X1) that is ethylene or an $\alpha$-olefin having 3 to 10 carbon atoms; and one or two or more kinds of units of polar monomers (Z1) that are a compound represented by the following general formula (1), wherein the multi-component polar olefin copolymer comprises at least any one structural unit of one or two or more kinds of units of nonpolar monomers (X2) that are different from the nonpolar monomer (X1) and are selected from the group consisting of ethylene and an $\alpha$-olefin having 3 to 10 carbon atoms; and one or two or more kinds of units of polar monomers (Z2) that are a compound represented by the following general formula (2).

$$H_2C=CH-COO-[-Q-]-T1 \quad (1)$$

$$H_2C=CH-T2 \quad (2)$$

wherein, in the general formula (1), Q represents a divalent hydrocarbon group having 2 to 10 carbon atoms, a divalent hydrocarbon group having 2 to 10 carbon atoms, which is substituted with a hydroxyl group, a divalent hydrocarbon group having 3 to 20 carbon atoms, which is substituted with an alkoxy group having 1 to 10 carbon atoms, a divalent hydrocarbon group having 4 to 20 carbon atoms, which is substituted with an ester group having 2 to 10 carbon atoms, a divalent hydrocarbon group having 5 to 28 carbon atoms, which is substituted with a substituted silyl group having 3 to 18 carbon atoms, a divalent hydrocarbon group having 2 to 10 carbon atoms, which is substituted with an ether group, or a divalent hydrocarbon group having 2 to 10 carbon atoms, which is substituted with a halogen atom, and T1 represents a methacryloyloxy group;

in the general formula (2), T2 represents a hydrocarbon group having 1 to 10 carbon atoms, which is substituted with a hydroxyl group, a hydrocarbon group having 2 to 20 carbon atoms, which is substituted with an alkoxy group having 1 to 10 carbon atoms, a hydrocarbon group having 3 to 20 carbon atoms, which is substituted with an ester group having 2 to 10 carbon atoms, a hydrocarbon group having 4 to 28 carbon atoms, which is substituted with a substituted silyl group having 3 to 18 carbon atoms, a hydrocarbon group having 1 to 10 carbon atoms, which is substituted with a halogen atom, an alkoxy group having 1 to 10 carbon atoms, an aryloxy group having 6 to 20 carbon atoms, a carboxyl group, an ester group having 2 to 10 carbon atoms, an acyloxy group having 2 to 10 carbon atoms, an amino group, a substituted amino group having 1 to 12 carbon atoms, a substituted silyl group having 3 to 18 carbon atoms, or a halogen atom.

[2] The multi-component polar olefin copolymer according to [1], which has a ratio (Mw/Mn) of 1.5 to 3.5, which is a ratio of weight-average molecular weight (Mw) to number-average molecular weight (Mn), as determined by gel permeation chromatography (GPC).

[3] The multi-component polar olefin copolymer according to [1] or [2], which has a degree of methyl branching of 5.0 or less per 1,000 carbons of the main chain, which is calculated by $^{13}$C-NMR.

[4] The multi-component polar olefin copolymer according to any one of [1] to [3], which is polymerized by using a transition metal catalyst of a Group-5 to Group-10 of the periodic table.

[5] The multi-component polar olefin copolymer according to [4], wherein the transition metal catalyst is a transition metal catalyst which contains nickel metal or palladium metal, and a chelatable phosphine compound coordinated thereto.

[6] A method for producing the multi-component polar olefin copolymer according to any one of [1] to [5], wherein the polymerization is carried out in the presence of a transition metal catalyst of a Group-5 to Group-10 of the periodic table.

[7] The method for producing the multi-component polar olefin copolymer according to [6], wherein the transition metal catalyst is a transition metal catalyst which contains nickel metal or palladium metal, and a chelatable phosphine compound coordinated thereto.

Advantageous Effects of Invention

The multi-component polar olefin copolymer of the present invention has high solvent solubility. Moreover, according to the production method of the present invention, a multi-component polar olefin copolymer having high solvent solubility can be produced.

DESCRIPTION OF EMBODIMENTS

Hereinafter, the multi-component polar olefin copolymer of the present invention and the method for producing the same will be specifically described in detail for each item.
1. With Respect to Multi-Component Polar Olefin Copolymer
(1) Multi-Component Polar Olefin Copolymer The multi-component polar olefin copolymer of the present invention is a multi-component polar olefin copolymer containing one kind of unit of nonpolar monomer (X1) that is ethylene or an α-olefin having 3 to 10 carbon atoms; and one or two or more kinds of units of polar monomers (Z1) that are a compound represented by the following general formula (1). Furthermore, the multi-component polar olefin copolymer is characterized in that it contains at least any one structural unit of one or two or more kinds of units of nonpolar monomers (X2) that are different from the nonpolar monomer (X1) and are selected from the group consisting of ethylene and an α-olefin having 3 to 10 carbon atoms and one or two or more kinds of units of polar monomers (Z2) that are a compound represented by the following general formula (2):

$$H_2C=CH-COO{-}Q{-}T1 \quad (1)$$

$$H_2C=CH-T2 \quad (2)$$

wherein, in the general formula (1), Q represents a divalent hydrocarbon group having 2 to 10 carbon atoms, a divalent hydrocarbon group having 2 to 10 carbon atoms, which is substituted with a hydroxyl group, a divalent hydrocarbon group having 3 to 20 carbon atoms, which is substituted with an alkoxy group having 1 to 10 carbon atoms, a divalent hydrocarbon group having 4 to 20 carbon atoms, which is substituted with an ester group having 2 to 10 carbon atoms, a divalent hydrocarbon group having 5 to 28 carbon atoms, which is substituted with a substituted silyl group having 3 to 18 carbon atoms, a divalent hydrocarbon group having 2 to 10 carbon atoms, which is substituted with an ether group, or a divalent hydrocarbon group having 2 to 10 carbon atoms, which is substituted with a halogen atom, and T1 represents a methacryloyloxy group;

in the general formula (2), T2 represents a hydrocarbon group having 1 to 10 carbon atoms, which is substituted with a hydroxyl group, a hydrocarbon group having 2 to 20 carbon atoms, which is substituted with an alkoxy group having 1 to 10 carbon atoms, a hydrocarbon group having 3 to 20 carbon atoms, which is substituted with an ester group having 2 to 10 carbon atoms, a hydrocarbon group having 4 to 28 carbon atoms, which is substituted with a substituted silyl group having 3 to 18 carbon atoms, a hydrocarbon group having 1 to 10 carbon atoms, which is substituted with a halogen atom, an alkoxy group having 1 to 10 carbon atoms, an aryloxy group having 6 to 20 carbon atoms, a carboxyl group, an ester group having 2 to 10 carbon atoms, an acyloxy group having 2 to 10 carbon atoms, an amino group, a substituted amino group having 1 to 12 carbon atoms, a substituted silyl group having 3 to 18 carbon atoms, or a halogen atom.
(2) Nonpolar Monomer
(2-1) Nonpolar Monomer (X1)

The nonpolar monomer (X1) to be used in the present invention is one kind of monomer of ethylene or an α-olefin having 3 to 10 carbon atoms.

Preferred specific examples include ethylene, propylene, 1-butene, 1-pentene, 1-hexene, 1-octene, 1-decene, 3-methyl-1-butene and 4-methyl-1-pentene, and ethylene may be mentioned as a particularly preferred specific example.

(2-2) Nonpolar Monomer (X2)

The nonpolar monomer (X2) to be used in the present invention is one or two or more kinds of monomers selected from the group consisting of ethylene and an α-olefin having 3 to 10 carbon atoms and the monomer is characterized in that it is not the same as X1, or is different from X1.

Preferred specific examples include the same examples as X1 described above. Moreover, one kind of X2 may be used alone or two or more kinds thereof may be used in combination.

As combinations of two kinds, there may be mentioned ethylene/propylene, ethylene/1-butene, ethylene/1-hexene, ethylene/1-octene, propylene/1-butene, propylene/1-hexene, propylene/1-octene, and the like. Preferably, combinations containing ethylene may be mentioned.

As combinations of three kinds, there may be mentioned ethylene/propylene/1-butene, ethylene/propylene/1-hexene, ethylene/propylene/1-octene, propylene/1-butene/hexene, propylene/1-butene/1-octene, and the like. Preferably, combinations containing ethylene may be mentioned.

(3) Polar Monomer (Z1)

The polar monomer (Z1) to be used in the present invention is a polar-group-containing monomer. The polar monomer (Z1) is an acrylate compound having a specific substituent, and is represented by the general formula (1). The polar monomer (Z1) may be one kind or two or more kinds.

$$H_2C=CH-COO-[-Q-]-T1 \quad (1)$$

wherein, in the general formula (1), Q represents a divalent hydrocarbon group having 2 to 10 carbon atoms, a divalent hydrocarbon group having 2 to 10 carbon atoms, which is substituted with a hydroxyl group, a divalent hydrocarbon group having 3 to 20 carbon atoms, which is substituted with an alkoxy group having 1 to 10 carbon atoms, a divalent hydrocarbon group having 4 to 20 carbon atoms, which is substituted with an ester group having 2 to 10 carbon atoms, a divalent hydrocarbon group having 5 to 28 carbon atoms, which is substituted with a substituted silyl group having 3 to 18 carbon atoms, a divalent hydrocarbon group having 2 to 10 carbon atoms, which is substituted with an ether group, or a divalent hydrocarbon group having 2 to 10 carbon atoms, which is substituted with a halogen atom, and T1 represents a methacryloyloxy group.

(3-1) Details of Polar Monomer (Z1)

The divalent hydrocarbon group having 2 to 10 carbon atoms as Q in the general formula (1) is preferably a divalent hydrocarbon group having 2 to 8 carbon atoms, and more preferably an alkylene group, a phenylene group, or an alkylene-phenylene-alkylene group, which have 2 to 8 carbon atoms.

Preferred specific examples are an ethylene group, a trimethylene group, a tetramethylene group, a pentamethylene group, a hexamethylene group, a 1,4-cyclohexylene group, a {methylene-(1,4-cyclohexylene)} group, a {methylene-(1,4-cyclohexylene)-methylene} group, a vinylene group, a 1-propenylene group, a 2-propenylene group, a 1-butenylene group, a 2-butenylene group, a 3-butenylene group, a 1-pentenylene group, a 2-pentenylene group, a 3-pentenylene group, a 4-pentenylene group, a 1-hexenylene group, a 2-hexenylene group, a 3-hexenylene group, a 4-hexenylene group, a 5-hexenylene group, a phenylene group, a methylenephenylene group and a {methylene-(1,4-phenylene)-methylene} group, and more preferred are an ethylene group, a trimethylene group, a tetramethylene group, a pentamethylene group, a hexamethylene group, a 4-hexenylene group, a {methylene-(1,4-cyclohexylene)-methylene} group, and a phenylene group, and particularly preferred are an ethylene group, a tetramethylene group, and a hexamethylene group.

The divalent hydrocarbon group having 2 to 10 carbon atoms, which is substituted with a hydroxyl group, as Q in the general formula (1) is preferably a hydroxyl group-substituted product of the aforementioned divalent hydrocarbon group having 2 to 10 carbon atoms. The number of the hydroxyl groups for the substitution may be one or two or more, and one is preferable from the viewpoint of easy production of the copolymer.

Preferred specific examples are a (1-hydroxy)ethylene group, a (2-hydroxy)ethylene group, a (1-hydroxy)trimethylene group, a (2-hydroxy)trimethylene group, a (3-hydroxy)trimethylene group, a (1-hydroxy)tetramethylene group, a (2-hydroxy)tetramethylene group, a (3-hydroxy)tetramethylene group, a (4-hydroxy)tetramethylene group, a (1-hydroxy)pentamethylene group, a (2-hydroxy)pentamethylene group, a (3-hydroxy)pentamethylene group, a (4-hydroxy)pentamethylene group, a (5-hydroxy)pentamethylene group, a (1-hydroxy)hexamethylene group, a (2-hydroxy)hexamethylene group, a (3-hydroxy)hexamethylene group, a (4-hydroxy)hexamethylene group, a (5-hydroxy)hexamethylene group and a (6-hydroxy)hexamethylene group, and more preferred are a (1-hydroxy)ethylene group, a (2-hydroxy)ethylene group, a (2-hydroxy)trimethylene group, a (5-hydroxy)pentamethylene group, and a (6-hydroxy)hexamethylene group, and particularly preferred are a (1-hydroxy)ethylene group and a (2-hydroxy)trimethylene group.

The divalent hydrocarbon group having 3 to 20 carbon atoms, which is substituted with an alkoxy group having 1 to 10 carbon atoms, as Q in the general formula (1) is preferably a structure where the divalent hydrocarbon group having 2 to 10 carbon atoms as described above is substituted with an alkoxy group having 1 to 10 carbon atoms. Incidentally, the 3 to 20 carbon atoms in the divalent hydrocarbon group indicates the total number of carbon atoms including the carbon number (1 to 10) of the substituting alkoxy group. The same applies to the following similar descriptions, and the carbon atoms indicates the total number of carbon atoms in the whole hydrocarbon group.

The number of the alkoxy groups for the substitution may be one or two or more, and even in the case of the substitution with two or more alkoxy groups, the total number of the carbon atoms in the divalent hydrocarbon group is 3 to 20. The number of the alkoxy groups for the substitution is preferably one in view of easy production of the copolymer.

The number of carbon atoms of the alkoxy group for the substitution is preferably 1 to 4, and more preferably 1 or 2.

Preferred specific examples are a (1-methoxy)ethylene group, a (2-methoxy)ethylene group, a (1-ethoxy)ethylene group, a (2-ethoxy)ethylene group, a (1-methoxy)trimethylene group, a (2-methoxy)trimethylene group, a (3-methoxy)trimethylene group, a (1-methoxy)tetramethylene group, a (2-methoxy)tetramethylene group, a (3-methoxy)tetramethylene group, a (4-methoxy)tetramethylene group, a (1-methoxy)pentamethylene group, a (2-methoxy)pentamethylene group, a (3-methoxy)pentamethylene group, a (4-methoxy)pentamethylene group, a (5-methoxy)pentamethylene group, a (1-methoxy)hexamethylene group, a (2-methoxy)hexamethylene group, a (3-methoxy)hexamethylene group, a (4-methoxy)hexamethylene group, a (5-methoxy)hexamethylene group and a (6-methoxy)hexamethylene group, and more preferred are a (1-methoxy)ethylene group, a (2-methoxy)ethylene group, a (1-ethoxy)ethylene group and a (2-ethoxy)ethylene group, and particularly preferred are a (1-methoxy)ethylene group and a (2-methoxy)ethylene group.

The divalent hydrocarbon group having 4 to 20 carbon atoms, which is substituted with an ester group having 2 to 10 carbon atoms, as Q in the general formula (1) is preferably a structure where the divalent hydrocarbon group having 2 to 10 carbon atoms as described above is substituted with an ester group having 2 to 10 carbon atoms. The number of the ester groups for the substitution may be one or two or more, and even in the case of the substitution with two or more ester groups, the total number of the carbon atoms in the divalent hydrocarbon group is 4 to 20. The number of the ester groups for the substitution is preferably one in view of easy production of the copolymer.

The ester group for the substitution is more preferably a methoxycarbonyl group or an ethoxycarbonyl group.

Preferred specific examples are a (1-methoxycarbonyl)ethylene group, a (2-methoxycarbonyl)ethylene group, a (1-ethoxycarbonyl)ethylene group, a (2-ethoxycarbonyl)ethylene group, a (1-methoxycarbonyl)trimethylene group, a (2-methoxycarbonyl)trimethylene group, a (3-methoxycarbonyl)trimethylene group, a (1-methoxycarbonyl)tetramethylene group, a (2-methoxycarbonyl)tetramethylene group, a (3-methoxycarbonyl)tetramethylene group, a (4-methoxycarbonyl)tetramethylene group, a (1-methoxycarbonyl)pentamethylene group, a (2-methoxycarbonyl)pentamethylene group, a (3-methoxycarbonyl)pentamethylene group, a (4-methoxycarbonyl)pentamethylene group, a (5-methoxycarbonyl)pentamethylene group, a (1-methoxycarbonyl)hexamethylene group, a (2-methoxycarbonyl)hexamethylene group, a (3-methoxycarbonyl)hexamethylene group, a (4-methoxycarbonyl)hexamethylene group, a (5-methoxycarbonyl)hexamethylene group and a (6-methoxycarbonyl)hexamethylene group, and more preferred are a (1-methoxycarbonyl)ethylene group, a (2-methoxycarbonyl)ethylene group, a (1-ethoxycarbonyl)ethylene group, and a (2-ethoxycarbonyl)ethylene group, and particularly preferred are a (1-methoxycarbonyl)ethylene group or a (2-methoxycarbonyl)ethylene group.

The divalent hydrocarbon group having 5 to 28 carbon atoms, which is substituted with a substituted silyl group having 3 to 18 carbon atoms, as Q in the general formula (1) is preferably a structure where the divalent hydrocarbon group having 2 to 10 carbon atoms as described above is substituted with a substituted silyl group having 3 to 18 carbon atoms. The number of the substituted silyl groups for the substitution may be one or two or more, and even in the case of the substitution with two or more substituted silyl groups, the total number of the carbon atoms in the divalent hydrocarbon group is 5 to 20. The number of the substituted silyl groups for the substitution is preferably one in view of easy production of the copolymer.

Moreover, the substituted silyl group is more preferably a trialkylsilyl group, and the three alkyls in the trialkylsilyl group may be the same or different, and a trimethylsilyl group or a triethylsilyl group is furthermore preferable.

Preferred specific examples are a (1-trimethylsilyl)ethylene group, a (2-trimethylsilyl)ethylene group, a (1-triethylsilyl)ethylene group, a (2-triethylsilyl)ethylene group, a (1-trimethylsilyl)trimethylene group, a (2-trimethylsilyl)trimethylene group, a (3-trimethylsilyl)trimethylene group, a (1-trimethylsilyl)tetramethylene group, a (2-trimethylsilyl)tetramethylene group, a (3-trimethylsilyl)tetramethylene group, a (4-trimethylsilyl)tetramethylene group, a (1-trimethylsilyl)pentamethylene group, a (2-trimethylsilyl)pentamethylene group, a (3-trimethylsilyl)pentamethylene group, a (4-trimethylsilyl)pentamethylene group, a (5-trimethylsilyl)pentamethylene group, a (1-trimethylsilyl)hexamethylene group, a (2-trimethylsilyl)hexamethylene group, a (3-trimethylsilyl)hexamethylene group, a (4-trimethylsilyl)hexamethylene group, a (5-trimethylsilyl)hexamethylene group and a (6-trimethylsilyl)hexamethylene group, and more preferred are (1-trimethylsilyl)ethylene group, a (2-trimethylsilyl)ethylene group, a (1-triethylsilyl)ethylene group, and a (2-triethylsilyl)ethylene group, and particularly preferred are a (1-trimethylsilyl)ethylene group and a (2-trimethylsilyl)ethylene group.

The divalent hydrocarbon group having 2 to 10 carbon atoms, which is substituted with an ether group, as Q in the general formula (1) is preferably a structure where a partial structure of the divalent hydrocarbon group having 2 to 10 carbon atoms as described above is substituted with an ether group. The number of portions as substituted with the ether group (ethereal oxygen atom) may be one or two or more, and is preferably one in view of easy production of the copolymer.

Preferred specific examples are a 1-oxapropylene group, a 1,4-dioxahexene group, a 1,4,7-trioxanonene group, and a 1,4,7,10-tetraoxadodecene group, and particularly preferred are a 1-oxapropylene group and a 1,4-dioxahexene group.

The divalent hydrocarbon group having 2 to 10 carbon atoms, which is substituted with a halogen atom, as Q in the general formula (1) is preferably a structure where the divalent hydrocarbon group having 2 to 10 carbon atoms as described above is substituted with a halogen atom. The number of the halogen atoms for the substitution may be one or two or more, and is preferably one in view of easy production of the copolymer. The halogen atom is more preferably a chlorine atom or a bromine atom.

Preferred specific examples are a (1-chloro)ethylene group, a (2-chloro)ethylene group, a (1-bromo)ethylene group, a (2-bromo)ethylene group, a (1-chloro)trimethylene group, a (2-chloro)trimethylene group, a (3-chloro)trimethylene group, a (1-chloro)tetramethylene group, a (2-chloro)tetramethylene group, a (3-chloro)tetramethylene group, a (4-chloro)tetramethylene group, a (1-chloro)pentamethylene group, a (2-chloro)pentamethylene group, a (3-chloro)pentamethylene group, a (4-chloro)pentamethylene group, a (5-chloro)pentamethylene group, a (1-chloro)hexamethylene group a (2-chloro)hexamethylene group, a (3-chloro)hexamethylene group, a (4-chloro)hexamethylene group, a (5-chloro)hexamethylene group and a (6-chloro)hexamethylene group, and more preferred are a (1-chloro)ethylene group, a (2-chloro)ethylene group, a (1-bromo)ethylene group, and a (2-bromo)ethylene group, and particularly preferred are a (1-chloro)ethylene group and a (2-chloro)ethylene group.

T1 in the general formula (1) represents a methacryloyloxy group.

Preferred combinations (A) to (C) of Q and T1 in the general formula (1) are shown below.

(A) Q is a divalent hydrocarbon group having 2 to 10 carbon atoms, which is substituted with a hydroxyl group, and T1 is a methacryloyloxy group.

(B) Q is a divalent hydrocarbon group having 2 to 10 carbon atoms, and T1 is a methacryloyloxy group.

(C) Q is a divalent hydrocarbon group having 2 to 10 carbon atoms, which is substituted with an ether group, and T1 is a methacryloyloxy group.

(3-2) Specific Examples of Polar Monomer (Z1)

Examples of the polar monomer (Z1) is specifically described below. Incidentally, (Z1-1) is an example of the combination (A) of Q and T1, (Z1-2) is an example of the combination (B) of Q and T1, and (Z1-3) is an example of the combination (C) of Q and T1.

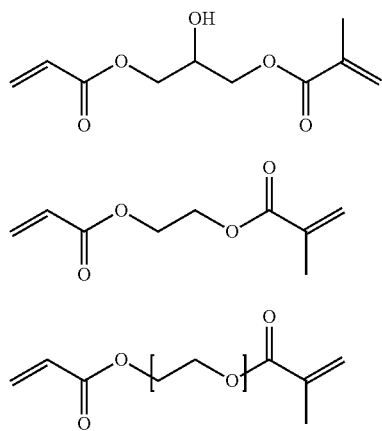

Incidentally, the repetition number of the part of [ ] in (Z1-3), i.e., (—$CH_2$—$CH_2$—O—), is preferably 1 to 3.

4) Polar Monomer (Z2)

The polar monomer (Z2) to be used in the present invention is a polar-group-containing monomer. The polar monomer (Z2) is a compound represented by the general formula (2), and may be one kind or two or more kinds.

wherein, in the general formula (2), T2 represents a hydrocarbon group having 1 to 10 carbon atoms, which is substituted with a hydroxyl group, a hydrocarbon group having 2 to 20 carbon atoms, which is substituted with an alkoxy group having 1 to 10 carbon atoms, a hydrocarbon group having 3 to 20 carbon atoms, which is substituted with an ester group having 2 to 10 carbon atoms, a hydrocarbon group having 4 to 28 carbon atoms, which is substituted with a substituted silyl group having 3 to 18 carbon atoms, a hydrocarbon group having 1 to 10 carbon atoms, which is substituted with a halogen atom, an alkoxy group having 1 to 10 carbon atoms, an aryloxy group having 6 to 20 carbon atoms, a carboxyl group, an ester group having 2 to 10 carbon atoms, an acyloxy group having 2 to 10 carbon atoms, an amino group, a substituted amino group having 1 to 12 carbon atoms, a substituted silyl group having 3 to 18 carbon atoms, or a halogen atom.

(4-1) Details of Polar-Group-Containing Monomer

In the hydrocarbon group having 1 to 10 carbon atoms, which is substituted with a hydroxyl group, as T2 in the general formula (2), the number of hydroxyl groups for the substitution may be one or two or more, and is preferably one in view of easy production of the copolymer. Specifically, there are, preferably, mentioned hydroxyl group-substituted products of an alkyl group having 1 to 10 carbon atoms, a cycloalkyl group having 3 to 10 carbon atoms, an alkenyl group having 2 to 10 carbon atoms, and an aryl group having 6 to 20 carbon atoms.

Here, examples of the alkyl group having 1 to 10 carbon atoms and the cycloalkyl group having 3 to 10 carbon atoms are a methyl group, an ethyl group, a 1-propyl group, a 1-butyl group, a 1-pentyl group, a 1-hexyl group a 1-heptyl group, a 1-octyl group, a 1-nonyl group, a 1-decyl group, a t-butyl group, a tricyclohexylmethyl group, an isopropyl group, a 1-dimethylpropyl group, a 1,1,2-trimethylpropyl group, a 1,1-diethylpropyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a cyclopropyl group, a cyclobutyl group, a cyclopentyl group, a methylcyclopentyl group, a chlorohexyl group, a methylcyclohexyl group, a cycloheptyl group, a cyclooctyl group, a cyclododecyl group, a 1-adamantyl group, a 2-adamantyl group, an exo-norbornyl group, an endo-norbornyl group, a 2-bicyclo[2.2.2]octyl group, a nopinyl group, a decahydronaphthyl group, a menthyl group, a neomentyl group, a neopentyl group, a 5-decyl group, and the like. Of these, preferred substituents are a methyl group and an ethyl group.

As an alkenyl group having 2 to 10 carbon atoms, a vinyl group, an allyl group, a butenyl group, a cinnamyl group, and a styryl group are mentioned. Of these, preferred substituents are a vinyl group and a styryl group, and particularly preferred is a styryl group.

As the aryl group having 6 to 20 carbon atoms, a phenyl group and a naphthyl group are mentioned, and examples of substituents which may be present on the aromatic rings of these aryl groups are alkyl groups, aryl groups, fused aryl groups, a phenylcyclohexyl groups, a phenylbutenyl group, a tolyl group, a xylyl group, a p-ethylphenyl group, and the like. Of these, a preferred aryl group is a phenyl group.

Preferred specific examples of the hydrocarbon group having 1 to 10 carbon atoms, which is substituted with a hydroxyl group, are a hydroxymethyl group, a 1-hydroxyethyl group, a 2-hydroxyethyl group, a 1-hydroxy-n-propyl group, a 2-hydroxy-n-propyl group, a 3-hydroxy-n-propyl group, a 1-hydroxy-isopropyl group, a 2-hydroxy-isopropyl group, a 2,2'-dihydroxy-isopropyl group, a 1-hydroxy-n-butyl group, a 2-hydroxy-n-butyl group, a 3-hydroxy-n-butyl group, a 4-hydroxy-n-butyl group, a 1-hydroxy-1-methyl-propyl group, a 1-hydroxy-2-methyl-propyl group, a 2-hydroxy-1-methyl-propyl group, a 2-hydroxy-2-methyl-propyl group, a 3-hydroxy-1-methyl-propyl group, a 3-hydroxy-2-methyl-propyl group, and a 3-hydroxy-3-methyl-propyl group. Of these, preferred are a hydroxymethyl group, a 1-hydroxyethyl group, and a 2-hydroxyethyl group, and particularly preferred are a hydroxymethyl group and 1-hydroxyethyl group.

The hydrocarbon group having 2 to 20 carbon atoms, which is substituted with an alkoxy group having 1 to 10 carbon atoms, as T2 in the general formula (2) is preferably a structure where a hydrocarbon group having 1 to 10 carbon atoms is substituted with an alkoxy group having 1 to 10 carbon atoms, and is, for example, a substituent where the alkyl group, the cycloalkyl group, the alkenyl group, or the aryl group as mentioned above is substituted with a methoxy group, an ethoxy group, an n-propoxy group, an isopropoxy group, an n-butoxy group, or a t-butoxy group. The number of the alkoxy groups for the substitution may be one or two or more, and even in the case of substitution with two or more alkoxy groups, the total number of carbon atoms of the hydrocarbon group is 2 to 20. The number of the alkoxy groups for the substitution is preferably one from the viewpoint of easy production of the copolymer.

More preferred is a hydrocarbon group having 2 to 6 carbon atoms, which is substituted with a methoxy group or an ethoxy group, and specifically, there are mentioned a 1-(methoxymethyl)ethyl group, a 1-(ethoxymethyl)ethyl group, a 1-(methoxyethyl)ethyl group, a 1-(ethoxyethyl) ethyl group, a di(methoxymethyl)methyl group, a di(ethoxymethyl)methyl group, and a di(phenoxymethyl) methyl group. Particularly preferred are a 1-(methoxymethyl)ethyl group and a 1-(ethoxymethyl)ethyl group.

The hydrocarbon group having 3 to 20 carbon atoms, which is substituted with an ester group having 2 to 10 carbon atoms, as T2 in the general formula (2) is preferably a structure where a hydrocarbon group having 1 to 10 carbon atoms is substituted with an ester group having 2 to 10 carbon atoms, and is, for example, a substituent where the alkyl group, the cycloalkyl group, the alkenyl group, or the aryl group as mentioned above is substituted with a methoxycarbonyl group, an ethoxycarbonyl group, an isopropoxycarbonyl group, a 1-propoxycarbonyl group, a 1-butoxycarbonyl group, a t-butoxycarbonyl group, or a phenoxycarbonyl group. The number of the ester groups for the substitution may be one or two or more, and even in the case of substitution with two or more ester groups, the total number of carbon atoms of the hydrocarbon group is 3 to 20. The number of the ester groups for the substitution is preferably one from the viewpoint of easy production of the copolymer.

More preferred is a hydrocarbon group having 3 to 5 carbon atoms, which is substituted with a methoxycarbonyl group or an ethoxycarbonyl group, and specifically, there are mentioned a 1-(methoxycarbonyl)methyl group, a 2-(methoxycarbonyl)ethyl group, a 1-(ethoxycarbonyl) methyl group, and a 2-(ethoxycarbonyl)ethyl group. More preferred is a 1-(methoxycarbonyl)methyl group or a 1-(ethoxycarbonyl)methyl group.

The hydrocarbon group having 4 to 28 carbon atoms, which is substituted with a substituted silyl group having 3 to 18 carbon atoms, as T2 in the general formula (2) is preferably a structure where a hydrocarbon group having 1 to 10 carbon atoms is substituted with a substituted silyl group having 3 to 18 carbon atoms, and is, for example, a (trimethylsilyl)methyl group, a ((dimethyl)(phenyl)silyl)methyl group, a ((diphenyl)(methyl)silyl)methyl group, a (triphenylsilyl)methyl group, or a bis(trimethylsilyl)methyl group. Of these, more preferable substituents are a (trimethylsilyl)methyl group and a bis(trimethylsilyl)methyl group. The number of the substituted silyl groups for the substitution may be one or two or more, and even in the case of the substitution with two or more substituted silyl groups, the total number of carbons in the divalent hydrocarbon group is 4 to 20. The number of the substituted silyl groups for the substitution is preferably one in view of easy production of the copolymer.

The hydrocarbon group having 1 to 10 carbon atoms, which is substituted with a halogen atom, as T2 in the general formula (2) is preferably a structure where a hydrocarbon group having 1 to 10 carbon atoms is substituted with a halogen atom, and is, for example, a substituent having 1 to 6 carbon atoms, which is substituted with a fluorine atom, a chlorine atom, or a bromine atom. The number of the halogen atoms for the substitution may be one or two or more, and is preferably one from the viewpoint of easy production of the copolymer. The halogen atom is more preferably a chlorine atom or a fluorine atom.

Specific preferred examples include a monochloromethyl group, a dichloromethyl group, a trifluoromethyl group, or a pentafluorophenyl group. Of these, more preferable substituents are a monochloromethyl group and a dichloromethyl group.

The alkoxy group having 1 to 10 carbon atoms as T2 in the general formula (2) is preferably an alkoxy group having 1 to 6 carbon atoms, and preferred specific examples thereof are a methoxy group, an ethoxy group, an n-propoxy group, an isopropoxy group, an n-butoxy group, and a t-butoxy group. Of these, a further preferable substituent is a methoxy group, an ethoxy group, or an isopropoxy group, and particularly preferred is a methoxy group.

The aryloxy group having 6 to 20 carbon atoms as T2 in the general formula (2) is preferably an aryloxy group having 6 to 12 carbon atoms, and preferred specific examples thereof are a phenoxy group, a 4-methylphenoxy group, a 4-methoxyphenoxy group, a 2,6-dimethylphenoxy group, and a 2,6-di-t-butylphenoxy group. Of these, a more preferable substituent is a phenoxy group or a 2,6-dimethylphenoxy group, and particularly preferred is a phenoxy group.

The ester group having 2 to 10 carbon atoms as T2 in the general formula (2) is preferably an ester group having 2 to 8 carbon atoms, and preferred specific examples thereof include a methoxycarbonyl group, an ethoxycarbonyl group, an n-propoxycarbonyl group, an isopropoxycarbonyl group, an n-butoxycarbonyl group, a t-butoxycarbonyl group, a (4-hydroxybutoxy)carbonyl group, a (4-glycidylbutoxy)carbonyl group, and a phenoxycarbonyl group. Of these, more preferable substituents are a methoxycarbonyl group, an ethoxycarbonyl group, an n-butoxycarbonyl group, a t-butoxycarbonyl group, and a (4-glycidylbutoxy)carbonyl group, and particularly preferred are a methoxycarbonyl group, an ethoxycarbonyl group, and n-butoxycarbonyl group.

The acyloxy group having 2 to 10 carbon atoms as T2 in the general formula (2) is preferably an acyloxy group having 2 to 8 carbon atoms, and preferred specific examples thereof include an acetyl group, a propionyl group, and a butyryl group.

The number of the amino groups for the substitution in the substituted amino group having 1 to 12 carbon atoms as T2 in the general formula (2) may be one or two or more. Further, as the substituent, an alkyl group, a phenyl group, a trialkylsilyl group, and the like may be mentioned. Preferred specific examples of the substituted amino group include a monomethylamino group, a dimethylamino group, a monoethylamino group, a diethylamino group, a monoisopropylamino group, a diisopropylamino group, a monophenylamino group, a diphenylamino group, and a bis(trimethylsilyl)amino group. Of these, more preferable substituents are a diphenylamino group and a bis(trimethylsilyl)amino group.

In the substituted silyl group having 3 to 18 carbon atoms as T2 in the general formula (2), the number of substituents to the silyl group may be one or two or more. Moreover, an alkyl group, a phenyl group, and the like are mentioned as the substituents. Preferred specific examples of the substituted silyl group are a trimethylsilyl group, a (dimethyl)(phenyl)silyl group, a (diphenyl)(methyl)silyl group, and a triphenylsilyl group. Among these, a more preferable substituent is a trimethylsilyl group.

The halogen atom as T2 in the general formula (2) is preferably a fluorine atom, a chlorine atom, or a bromine atom, and is more preferably a chlorine atom.

(4-2) Specific Examples of Polar Monomer (Z2)

Specific examples of the polar monomer (Z2) preferably include trimethylsilyl acrylate, methyl acrylate, ethyl acrylate, n-butyl acrylate, and t-butyl acrylate. Of these, more preferable polar monomers (Z2) are methyl acrylate, ethyl acrylate, and n-butyl acrylate.

(5) Copolymer Composition (Olefin Copolymer Composition)

In the multi-component polar olefin copolymer in the present invention, the amount of structural units derived from the polar monomer (Z1) in the copolymer is not particularly limited, but is preferably 0.01 to 10 mol %. Among the range, 0.1 to 5.0 mol % is more preferable, and 0.2 to 1.5 mol % is particularly preferable.

Moreover, the amount of structural units derived from the polar monomer (Z2) in the copolymer is not particularly limited, but is preferably 0.01 to 15 mol %. Among the range, 0.1 to 12 mol % is more preferable, and 5.0 to 10.0 mol % is particularly preferable.

The amount of the structural units is controllable by the selection of the transition metal catalyst at the time of polymerization, the amount of the polar monomers to be added at the time of polymerization, and the pressure and temperature at the time of polymerization. As a specific means for increasing the amount of the structural units derived from the polar monomers in the copolymer, it is effective to increase the amount of the polar monomers to be added at the time of polymerization, to reduce the olefin pressure at the time of polymerization, and to increase the polymerization temperature. For example, by controlling these factors, it is required to control the amount of the structural units to the target copolymer region.

Incidentally, in the multi-component polar olefin copolymer of the present invention, other monomer units than the units of the non-polar monomer (X1), the units of the non-polar monomer (X2), the units of the polar monomer (Z1), and the units of the polar monomer (Z2) may be contained.

As the other monomers, there may be mentioned cyclic olefin monomers such as cyclopentene, cyclohexene, norbornene and ethylidenenorbornene, styrene-based monomers such as p-methylstyrene, and the like, and in these skeletons, a hydroxyl group, an alkoxide group, a carboxylic acid group, an ester group, and/or an aldehyde group may be contained.

The multi-component polar olefin copolymer in the present invention preferably has a degree of methyl branching of 5.0 or less per 1,000 carbons of the main chain, which is calculated by $^{13}$C-NMR. Among the range, the degree is particularly preferably 3.0 or less per 1,000 carbons of the main chain. When methyl branching satisfies this numerical value, the elastic modulus is high and the mechanical strength of molding is also high.

The degree of methyl branching is controllable by the selection of the transition metal catalyst to be used for polymerization and the polymerization temperature. As a specific means for reducing the degree of methyl branching of the multi-component polar olefin copolymer, it is effective to decrease the polymerization temperature. For example, by adjusting these factors, the degree is controllable to the desired copolymer region.

Moreover, the multi-component polar olefin copolymer in the present invention preferably has a ratio (Mw/Mn) of 1.5 to 3.5, which is a ratio of weight average molecular weight (Mw) to number average molecular weight (Mn), as determined by gel permeation chromatography (GPC). Among the range, the ratio is more preferably in the range of 1.6 to 3.3, and particularly preferably in the range of 1.7 to 3.0.

When Mw/Mn of the multi-component polar olefin copolymer in the present invention satisfies the above requirement, various types of processability including the formation of a laminate become sufficient, and the adhesive strength becomes excellent. Mw/Mn is controllable by the selection of the transition metal catalyst to be used.

2. With respect to Method for Producing Multi-component Polar Olefin Copolymer (1) Transition Metal Catalyst As an example of the method for producing the multi-component polar olefin copolymer of the present invention, there is a method of polymerization using a transition metal compound of a Group-5 to Group-10 of the periodic table as a catalyst.

Preferred specific examples of the transition metal include vanadium atom, niobium atom, tantalum atom, chromium atom, molybdenum atom, tungsten atom, manganese atom, iron atom, ruthenium atom, cobalt atom, rhodium atom, nickel atom, palladium atom, and the like. Preferred of these are Group-8 to Group-11 transition metals of the periodic table, more preferred are Group-10 transition metals of the periodic table, and particularly preferred are nickel (Ni) and palladium (Pd). One of these metals may be used alone or two or more thereof may be used in combination.

As a transition metal catalyst, a transition metal compound of a Group-5 to Group-10 of the periodic table having a chelatable ligand is preferably used as a catalyst.

The chelatable ligand has at least two atoms selected from the group consisting of P, N, O, and S, contains a bidentate or multidentate ligand, and is electronically neutral or anionic. Examples of the structure thereof are shown in the review written by Brookhart et al. (Chem. Rev., 2000, 100, 1169). Preferred examples of bidentate anionic P, O ligands include phosphorus sulfonic acids, phosphorus carboxylic acids, phosphorus phenols, and phosphorus enolates. Furthermore, preferred examples of bidentate anionic N, O ligands include salicylaldoiminates and pyridinecarboxylic acid, and other examples include diimine ligands, diphenoxide ligands, and diamide ligands.

As a transition metal compound of a Group-5 to Group-10 of the periodic table having a chelatable ligand, typically, a so-called phosphine phenolate-based catalyst (transition metal catalyst coordinated with a chelatable phosphine compound) is known. The phosphine phenolate-based catalyst is a catalyst where a phosphorus-based ligand having an aryl group that may have a substituent is coordinated to nickel metal (see, for example, JP-A-2010-260913).

(2) Use Embodiment of Polymerization Catalyst

The polymerization catalyst may be used alone or may be used after being supported on a carrier. As the carrier that can be used, any carrier can be used as long as the gist of the present invention is not impaired.

In general, inorganic oxides and polymer carriers can be suitably used as the carrier. Specifically, $SiO_2$, $Al_2O_3$, MgO, $ZrO_2$, $TiO_2$, $B_2O_3$, CaO, ZnO, BaO, $ThO_2$, etc., or a mixture thereof may be mentioned, mixed oxides such as $SiO_2$—$Al_2O_3$, $SiO_2$—$V_2O_5$, $SiO_2$—$TiO_2$, $SiO_2$—MgO, and $SiO_2$—$Cr_2O_3$ can also be used, and inorganic silicates, polyethylene carriers, polypropylene carriers, polystyrene carriers, polyacrylic acid carriers, polymethacrylic acid carriers, polyacrylic acid ester carriers, polyester carriers, polyamide carriers, polyimide carriers, and the like can be used.

With regard to these carriers, the particle size, particle size distribution, pore volume, specific surface area, and the like are not particularly limited, and any ones can be used.

Using the catalyst component, prepolymerization may be carried out in the presence of an olefin, in a polymerization vessel or outside the polymerization vessel. The olefin means a hydrocarbon containing at least one carbon-carbon double bond, and examples thereof include ethylene, propylene, 1-butene, 1-hexene, 3-methylbutene-1, styrene, and divinylbenzene, but there is no limitation in the kind, and mixtures of these with other olefins may be used. Preferred is an olefin having 2 or 3 carbon atoms. The method of supplying the olefin can be any method such as a method of supplying the olefin to a reaction vessel at a constant speed or a constant pressure state, a combination thereof, or a method of carrying out a stepwise change thereof.

(3) Copolymerization Reaction

The copolymerization reaction in the present invention is carried out in the presence or absence of a solvent. Examples of the solvent include hydrocarbon solvents such as propane, n-butane, isobutane, n-hexane, n-heptane, toluene, xylene, cyclohexane, and methylcyclohexane, liquids such as liquefied α-olefins, and polar solvents such as diethyl ether, ethylene glycol dimethyl ether, tetrahydrofuran, dioxane, ethyl acetate, methyl benzoate, acetone, methyl ethyl ketone, formylamide, acetonitrile, methanol, isopropyl alcohol, and ethylene glycol. Also, a mixture of the solvents described herein may be used as a mixed solvent. Incidentally, in order to obtain high polymerization activity and high molecular weight, the above-mentioned hydrocarbon solvents are more preferable.

At the copolymerization in the present invention, the copolymerization can be carried out in the presence or absence of a known additive. As the additive, a radical polymerization inhibitor and an additive having an effect of stabilizing a formed copolymer are preferable. For example, quinone derivatives and hindered phenol derivatives may be mentioned as examples of preferable additives.

Specifically, monomethyl ether hydroquinone, 2,6-di-t-butyl-4-methylphenol (BHT), a reaction product of trimethylaluminum and BHT, a reaction product of an alkoxide of tetravalent titanium and BHT, and the like can be used.

Moreover, using inorganic and/or organic fillers as an additive, polymerization may be carried out in the presence of these fillers.

In the present invention, the type of polymerization is not particularly limited. Preferably used are slurry polymerization in which at least a part of a formed polymer becomes a slurry in the medium, bulk polymerization using a liquefied monomer itself as a medium, gas-phase polymerization to be carried out in vaporized monomer, or high-pressure ionic polymerization in which at least a part of a formed polymer is dissolved into a liquefied monomer under high temperature and high pressure, or the like.

Moreover, as a polymerization mode, any mode of batch polymerization, semi-batch polymerization, and continuous polymerization may be adopted.

Unreacted monomers and media may be separated from the produced multi-component polar olefin copolymer and recycled for use. At the time of recycling, these monomers and media may be purified and reused, or may be reused without purification. Conventionally known methods can be used at the separation of the formed copolymer from the unreacted monomers and media. For example, methods such as filtration, centrifugation, solvent extraction, reprecipitation using a poor solvent can be used.

There are no particular limitations on the copolymerization temperature, copolymerization pressure, and copolymerization time, but usually, optimum settings can be made from the following ranges in consideration of productivity and process capability.

That is, the copolymerization temperature can be usually selected from the range of −20° C. to 290° C., preferably 0° C. to 250° C., the copolymerization pressure can be selected from the range of 0.1 MPa to 100 MPa, preferably 0.3 MPa to 90 MPa, and the copolymerization time can be selected from the range of 0.1 minutes to 10 hours, preferably 0.5 minutes to 7 hours, more preferably 1 minute to 6 hours.

In the present invention, the copolymerization is generally carried out under an inert gas atmosphere. For example, a nitrogen or argon atmosphere can be used, and a nitrogen atmosphere is preferably used. Incidentally, a small amount of oxygen or air may be mixed therein.

There is also no particular limitation on the supply of the catalyst and the monomers to the copolymerization reactor, and various supplying methods can be adopted depending on the purpose. For example, in the case of batch polymerization, it is possible to perform a method of supplying a predetermined amount of monomers to the copolymerization reactor in advance and supplying the catalyst thereto. In this case, additional monomers and an additional catalyst may be supplied to the copolymerization reactor. In the case of continuous polymerization, it is possible to perform a method of continuously or intermittently supplying a predetermined amount of the monomers and the catalyst to the copolymerization reactor and performing the copolymerization reaction continuously.

With regard to the control of composition of the multi-component polar olefin copolymer, a method of controlling the composition by supplying a plurality of monomers to the reactor and changing the supply ratio can be generally used. Other methods include a method of controlling the copolymerization composition by utilizing the difference in monomer reactivity ratio owing to the difference in catalyst structure, and a method of controlling the copolymerization composition by utilizing the polymerization temperature dependency of the monomer reactivity ratio.

A conventionally known method can be used for controlling the molecular weight of the multi-component polar olefin copolymer. That is, there are mentioned a method of controlling the molecular weight by controlling the polymerization temperature, a method of controlling the molecular weight by controlling the monomer concentration, a method of controlling the molecular weight by using a chain transfer agent, and a control of the molecular weight by controlling the ligand structure in the transition metal complex, for example.

In the case of using a chain transfer agent, conventionally known chain transfer agents can be used. For example, hydrogen, a metal alkyl, and the like can be used.

EXAMPLES

Hereinafter, the present invention will be described in more detail with reference to Examples and Comparative Examples, but the invention is not limited to the following examples. Various evaluation methods of the multi-component polar olefin copolymers produced in the present invention are as follows.

The catalyst and ligand structure used in Examples are shown below.

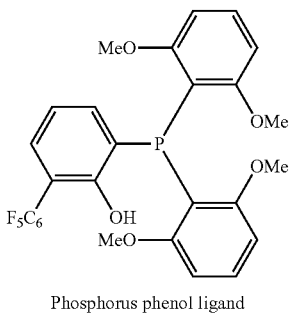

Phosphorus phenol ligand (I)

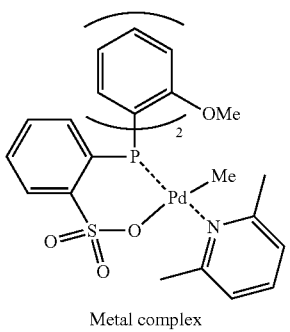

Metal complex (II)

1. Evaluation Methods
(1) Molecular Weight and Molecular Weight Distribution (Mw, Mn, Q Value)
(Measurement Conditions)

Model used: 150C manufactured by Waters Inc.

Detector: MIRAN 1A, IR Detector (measuring wavelength: 3.42 µm) manufactured by FOXBORO Company Measurement temperature: 140° C.

Solvent: o-dichlorobenzene (ODCB)

Columns: AD806M/S (three columns) manufactured by Showa Denko K.K.

Flow rate: 1.0 mL/minute

Injection amount: 0.2 mL (Preparation of Sample)

A sample was prepared as a 1 mg/mL solution using ODCB (containing 0.5 mg/mL BHT (2,6-di-t-butyl-4-methylphenol)), the copolymer being dissolved at 140° C. for about 1 hour.

(Calculation of Molecular Weight)

The standard polystyrene method was used, and the conversion from retention volume to molecular weight was performed using a calibration curve which had been prepared beforehand with standard polystyrenes. The standard polystyrenes used are all manufactured by Tosoh Corporation, and are trade names F380, F288, F128, F80, F40, F20, F10, F4, F1, A5000, A2500, and A1000. The calibration curve was prepared by injecting 0.2 mL of a solution of each one dissolved in ODCB (containing 0.5 mg/mL BHT) so as to be 0.5 mg/mL. In the calibration curve, the cubic equation approximately obtained by the least square method was used. For the viscosity equation $[\eta]=K \times M^{\alpha}$ for use in the conversion into molecular weight, the following numerical values were used.

PS: $K=1.38 \times 10^{-4}$, $\alpha=0.7$
PE: $K=3.92 \times 10^{-4}$, $\alpha=0.733$
PP: $K=1.03 \times 10^{-4}$, $\alpha=0.78$ (2) Melting Point (Tm)

Using DSC6200 differential scanning calorimeter manufactured by Seiko Instruments Inc., 5 mg of a sheet-shaped sample piece was packed in an aluminum pan, and the temperature was once raised from room temperature to 200° C. at a temperature-raising rate of 100° C./minute and held for 5 minutes. Thereafter, the temperature was lowered to 20° C. at a rate of 10° C./minute for crystallization, and then the temperature was raised to 200° C. at a rate of 10° C./minute to obtain a melting curve. The peak top temperature of the main endothermic peak in the last temperature-raising step performed for obtaining the melting curve was taken as the melting point Tm, and the peak area of the peak was taken as ΔHm.

(3) NMR Analysis
(3-1) Measurement Conditions of Multi-component Polar Olefin Copolymer 200 mg of a sample was put in an NMR sample tube having an inner diameter of 10 mmϕ together with deuterated tetrachloroethane and replacement with nitrogen was performed. Thereafter, the sample tube was sealed and heated for dissolution to form a homogeneous solution and the solution was subjected to NMR measurement. For the NMR measurement, an NMR apparatus, AVANCE III400 of Bruker Biospin K. K., which has a cryoprobe having 10 mmϕ was used.

As for $^{13}$C-NMR measurement conditions, measurement was performed by the reverse gate decoupling method, at a sample temperature of 120° C., a pulse angle of 90°, and a pulse interval of 51.5 seconds, the number of integrations being 512.

As for the chemical shifts, the $^{13}$C signal of tetrachloroethane was set to 74.3 ppm, and the chemical shifts of the signals derived from the other $^{13}$C were determined using the chemical shift as a reference.

(3-2) Method of Measuring Amount of Methyl Branching of Terpolymer of Ethylene/Methyl Acrylate/2-Acryloyloxyethyl Methacrylate As for methyl branching, using the value $I_{B1}$ which was obtained by dividing the sum of integrated intensities of signals by 3, wherein the signals were derived from methyl carbon at 20.0 to 19.8 ppm and methylene carbon at 37.6 to 37.3 ppm on a $^{13}$C-NMR spectrum, and the number of methyl branches per 1,000 carbons of the main chain (main chain 1000C) was calculated using the following equation.

Number of methyl branches(branches/main chain1000C)=$I_{B1} \times 1000 / \{2 \times (I_{B1} + I_{MA\text{-}br} + I_{MAEA\text{-}br} + I_E)\}$ Here, $I_{B1}$, $I_{MA\text{-}br}$, $I_{MAEA\text{-}br}$, and $I_E$ are amounts shown by the following equations, respectively.

$I_{B1} = (I_{20.0\text{-}19.8} + I_{37.6\text{-}37.3})/3$, $I_{MA\text{-}br} = I_{46.5\text{-}45.8} + I_{44.5\text{-}43.5}$, $I_{MAEA\text{-}br} = I_{45.8\text{-}45.4}$, $I_E = [I_{31.0\text{-}28.5} + 3 \times (I_{MA\text{-}br} + I_{MAE\text{-}br} + I_{B1})]/2$ I represents integrated intensity, and the numerical values of subscript of I indicate a range of chemical shift. For example, $I_{31.0\text{-}28.5}$ indicates integrated intensity of the signals detected between 31.0 ppm and 28.5 ppm.

(3-3) Method of Measuring Comonomer Content of Terpolymer of Ethylene/Methyl Acrylate/2-Acryloyloxyethyl Methacrylate Signals of two methylene carbons bonded to acrylate of methacryloyloxyethyl acrylate (MAEA) are detected at 64.0 to 61.0 ppm on a $^{13}$C-NMR spectrum. Moreover, the methyl carbon derived from the methoxy group of methyl acrylate (MA) is detected at 53.0 to 51.0 ppm. Using these signal intensities, the total amounts of MAEA and MA were calculated from the following equations.

MAEA total amount(mol %)=$I_{total\ MAEA} \times 100 / [I_{total\ MAEA} + I_{total\ MA} + I_E]$ MA total amount(mol %)=$I_{total\ MA} \times 100 / [I_{total\ MAEA} + I_{total\ MA} + I_E]$ Here, $I_{total\ MAEA}$, $I_{total\ MA}$, and $I_E$ are the amounts shown by the following equations, respectively.

$I_{total\ MAEA} = I_{64.0-61.0}/2$ $I_{total\ MA} = I_{53.0-51.0}$ $I_E = (I_{180.0-110.0} + I_{72.0-2.0} - I_{total\ MAEA} \times 9 - I_{total\ MA} \times 4)/2$ I indicates integrated intensity, and the numerical value of subscript of I indicates a range of chemical shift. For example, $I_{180.0-110.0}$ indicates integrated intensity of the signals detected between 180.0 ppm and 110.0 ppm.

(3-4) Method of Measuring Amount of Methyl Branching of Terpolymer of Ethylene/Butyl Acrylate/2-Acryloyloxyethyl Methacrylate As for methyl branching, using the value $I_{B1}$ obtained by dividing the sum of integrated intensities of signals by 4, wherein the signals were derived from methyl carbon at 20.0 to 19.8 ppm, methine carbon at 33.3 to 33.0 ppm, and methylene carbon at 37.6 to 37.3 ppm on a $^{13}$C-NMR spectrum, and the number of methyl branches per 1,000 carbons of the main chain was calculated using the following equation.

Number of methyl branches(branches/main chain1000C)=$I_{B1} \times 1000 / \{2 \times (I_{B1} + I_{nBA-br} + I_{MAEA-br} + I_E)\}$ Here, $I_{B1}$, $I_{nBA-br}$, $I_{MAEA-br}$, and $I_E$ are amounts shown by the following equations, respectively.

$I_{B1} = (I_{20.0-19.8} + I_{33.3-33.0} + I_{37.6-37.3})/4$, $I_{nBA-br} = I_{46.4-46.0} + I_{44.6-43.8}$, $I_{MAEA-br} = I_{46.0-45.7}$, $I_E = [I_{31.0-28.0} + 3 \times (I_{nBA-br} + I_{MAEA-br} + I_{B1})]/2$ I represents integrated intensity, and the numerical values of subscript of I indicate a range of chemical shift. For example, $I_{31.0-28.0}$ indicates integrated intensity of the signals detected between 31.0 ppm and 28.0 ppm.

(3-5) Method of Measuring Comonomer Content of Terpolymer of Ethylene/Butyl Acrylate/2-Acryloyloxyethyl Methacrylate Signals of two methylene carbons bonded to acrylate of methacryloyloxyethyl acrylate (MAEA) are detected at 63.0 to 61.0 ppm on a $^{13}$C-NMR spectrum. Moreover, the methyl carbon derived from the n-butoxy group of n-butyl acrylate (nBA) is detected at 14.1 to 13.6 ppm and three methylene carbons are detected at 19.8 to 19.3 ppm, 31.4 to 31.1 ppm, and 64.5 to 63.8 ppm. Using these signal intensities, the total amounts of MAEA and nBA were calculated from the following equations.

MAEA total amount(mol %)=$I_{total\ MAEA} \times 100 / [I_{total\ MAEA} + I_{total\ nBA} + I_E]$ nBA total amount(mol %)=$I_{total\ nBA} \times 100 / [I_{total\ MAEA} + I_{total\ nBA} + I_E]$ Here, $I_{total\ MAEA}$, $I_{total\ nBA}$, and $I_E$ are the amounts shown by the following equations, respectively.

$I_{total\ MAEA} = I_{63.0-61.0}/2$ $I_{total\ nBA} = (I_{14.1-13.6} + I_{19.8-19.3} + I_{31.4-31.1} + I_{64.5-63.8})/4$ $I_E = (I_{180.0-110.0} + I_{72.0-2.0} - I_{total\ MAEA} \times 9 - I_{total\ nBA} \times 7)/2$ I indicates integrated intensity, and the numerical values of subscript of I indicate a range of chemical shift. For example, $I_{180.0-110.0}$ indicates integrated intensity of the signals detected between 180.0 ppm and 110.0 ppm.

(4) Solubility Test

In a 50 mL glass-made beaker, 0.1 g of a powdery or pelletized multi-component polar olefin copolymer was weighed and put, and 10 mL of a solvent (methyl methacrylate (MMA), toluene, ethyl acetate, or o-dichlorobenzene (ODCB) was added thereto. An oil bath equipped with a thermostat was set to 90° C., about a half of the beaker was put into the oil bath, and the multi-component polar olefin copolymer was dissolved while stirring the beaker by hand. The time until the multi-component polar olefin copolymer was completely dissolved after the beaker was put in the oil bath was measured by visual observation.

2. Synthesis of Catalyst

The phosphorus phenol ligand (I) was synthesized according to the method described in WO2010/050256 (Synthetic Example 4). The metal complex (II) was synthesized according to the method described in J. Am. Chem. Soc., 2007, 129, 8948-8949.

3. Polymerization

Example 1

Ternary Copolymerization of Ethylene/Methyl Acrylate/2-Acryloyloxyethyl Methacrylate A catalyst solution was prepared by weighing each of 360 μmol of bis(cyclooctadiene)nickel and the phosphorus phenol ligand (I) in a 30 mL flask which had sufficiently replaced with nitrogen, adding dehydrated toluene (10 mL), and subsequently stirring the whole for 10 minutes. Next, the inside of a stainless steel-made autoclave having an internal capacity of 2.4 L and equipped with an induction stirrer was replaced with purified nitrogen, and purified toluene (1000 mL), a tri-n-octylaluminum heptane solution (3.2 mmol), methyl acrylate (comonomer concentration: 0.110 mol/L), and 2-acryloyloxyethyl methacrylate (comonomer concentration: 0.013 mol/L) were introduced into the autoclave. At a polymerization temperature of 90° C. and an ethylene pressure of 2.5 MPa, the catalyst solution prepared above was added thereto and polymerization was carried out for 100 minutes.

After the polymerization was completed, ethylene was purged, the autoclave was cooled to room temperature, and the obtained polymer was reprecipitated with acetone (1 L). The solid polymer obtained by filtration was washed with hydrochloric acid (100 mL) and then dried under reduced pressure at 60° C. for 3 hours, thereby recovering 12.2 g of a copolymer.

Example 2

Ternary Copolymerization of Ethylene/Methyl Acrylate/2-Acryloyloxyethyl Methacrylate A catalyst solution was prepared by weighing each of 360 μmol of bis(cyclooctadiene)nickel and the phosphorus phenol ligand (I) in a 30 mL flask which had sufficiently replaced with nitrogen, adding dehydrated toluene (10 mL), and subsequently stirring the whole for 10 minutes. Next, the inside of a stainless steel-made autoclave having an internal capacity of 2.4 L and equipped with an induction stirrer was replaced with purified nitrogen, and purified toluene (1000 mL), a tri-n-octylaluminum heptane solution (3.2 mmol), methyl acrylate (comonomer concentration: 0.120 mol/L), and 2-acryloyloxyethyl methacrylate (comonomer concentration: 0.010 mol/L) were introduced into the autoclave. At a polymerization temperature of 90° C. and an ethylene pressure of 2.5 MPa, the catalyst solution prepared above was added thereto and polymerization was carried out for 100 minutes.

After the polymerization was completed, ethylene was purged, the autoclave was cooled to room temperature, and the obtained polymer was reprecipitated with acetone (1 L). The solid polymer obtained by filtration was washed with hydrochloric acid (100 mL) and then dried under reduced pressure at 60° C. for 3 hours, thereby recovering 12.8 g of a copolymer.

Example 3

Ternary Copolymerization of Ethylene/Methyl Acrylate/2-Acryloyloxyethyl Methacrylate A catalyst solution was prepared by weighing 300 μmol of the metal complex (II) in a 30 mL flask which had sufficiently replaced with nitrogen, adding dehydrated toluene (10 mL), and subsequently stirring the whole for 10 minutes. Next, the inside of a stainless steel-made autoclave having an internal capacity of 2.4 L and equipped with an induction stirrer was replaced with purified nitrogen, and purified toluene (500 mL), methyl acrylate (comonomer concentration: 1.480 mol/L), and 2-acryloyloxyethyl methacrylate (comonomer concentration: 0.010 mol/L) were introduced into the autoclave. At a polymerization temperature of 80° C. and an ethylene pressure of 1.0 MPa, the catalyst solution prepared above was added thereto and polymerization was carried out for 100 minutes.

After the polymerization was completed, ethylene was purged, the autoclave was cooled to room temperature, and the obtained polymer was reprecipitated with acetone (1 L). The solid polymer obtained by filtration was washed with hydrochloric acid (100 mL) and then dried under reduced pressure at 60° C. for 3 hours, thereby recovering 4.9 g of a copolymer.

Example 4 Ternary Copolymerization of Ethylene/Butyl Acrylate/2-Acryloyloxyethyl Methacrylate A catalyst solution was prepared by weighing each of 480 μmol of bis(cyclooctadiene)nickel and the phosphorus phenol ligand (I) in a 30 mL flask which had sufficiently replaced with nitrogen, adding dehydrated toluene (10 mL), and subsequently stirring the whole for 10 minutes. Next, the inside of a stainless steel-made autoclave having an internal capacity of 2.4 L and equipped with an induction stirrer was replaced with purified nitrogen, and purified toluene (1000 mL), a tri-n-octylaluminum heptane solution (3.2 mmol), butyl acrylate (comonomer concentration: 0.250 mon), and 2-acryloyloxyethyl methacrylate (comonomer concentration: 0.007 mol/L) were introduced into the autoclave. At a polymerization temperature of 100° C. and an ethylene pressure of 2.5 MPa, the catalyst solution prepared above was added thereto and polymerization was carried out for 40 minutes.

After the polymerization was completed, ethylene was purged, the autoclave was cooled to room temperature, and the obtained polymer was reprecipitated with acetone (1 L). The solid polymer obtained by filtration was washed with hydrochloric acid (100 mL) and then dried under reduced pressure at 60° C. for 3 hours, thereby recovering 12.1 g of a copolymer.

Example 5 Ternary Copolymerization of Ethylene/Butyl Acrylate/2-Acryloyloxyethyl Methacrylate A catalyst solution was prepared by weighing each of 480 μmol of bis(cyclooctadiene)nickel and the phosphorus phenol ligand (I) in a 30 mL flask which had sufficiently replaced with nitrogen, adding dehydrated toluene (10 mL), and subsequently stirring the whole for 10 minutes. Next, the inside of a stainless steel-made autoclave having an internal capacity of 2.4 L and equipped with an induction stirrer was replaced with purified nitrogen, and purified toluene (1000 mL), a tri-n-octylaluminum heptane solution (3.2 mmol), butyl acrylate (comonomer concentration: 0.250 mol/L), and 2-acryloyloxyethyl methacrylate (comonomer concentration: 0,007 mol/L) were introduced into the autoclave. Ata polymerization temperature of 110° C. and an ethylene pressure of 2.5 MPa, the catalyst solution prepared above was added thereto and polymerization was carried out for 35 minutes.

After the polymerization was completed, ethylene was purged, the autoclave was cooled to room temperature, and the obtained polymer was reprecipitated with acetone (1 L). The solid polymer obtained by filtration was washed with hydrochloric acid (100 mL) and then dried under reduced pressure at 60° C. for 3 hours, thereby recovering 8.7 g of a copolymer.

Comparative Example 1

Copolymerization of Ethylene/2-Acryloyloxyethyl Methacrylate

A catalyst solution was prepared by weighing each of 40 μmol of bis(cyclooctadiene)nickel and the phosphorus phenol ligand (I) in a 30 mL flask which had sufficiently replaced with nitrogen, adding dehydrated toluene (10 mL), and subsequently stirring the whole for 10 minutes. Next, the inside of a stainless steel-made autoclave having an internal capacity of 2.4 L and equipped with an induction stirrer was replaced with purified nitrogen, and purified toluene (1000 mL), a tri-n-octylaluminum heptane solution (0.2 mmol), and 2-acryloyloxyethyl methacrylate (comonomer concentration: 0.006 mol/L) were introduced into the autoclave. At a polymerization temperature of 90° C. and an ethylene pressure of 2.5 MPa, the catalyst solution prepared above was added and polymerization was carried out for 18 minutes.

After the polymerization was completed, ethylene was purged, the autoclave was cooled to room temperature, and the obtained polymer was reprecipitated with acetone (1 L). The solid polymer obtained by filtration was washed with hydrochloric acid (100 mL) and then dried under reduced pressure at 60° C. for 3 hours, thereby recovering 23.5 g of a copolymer.

4. Results and Considerations

The results of evaluating the physical properties and the solubility test of the copolymers of Examples and Comparative Examples are shown in Table 1. Incidentally, as for the copolymers of Comparative Examples 2 to 4, REXPEARL EMA manufactured by Japan Polyethylene Corporation, which is an ethylene/methyl acrylate copolymer produced by a high pressure radical polymerization process, was used.

TABLE 1

| | Polar monomer [Z1] | Polar monomer [Z2] | Weight-average molecular weight Mw*10$^{-4}$ | Molecular weight distribution parameter Mw/Mn | Amount of polar-group structural unit [Z1] mol % | Amount of polar-group structural unit [Z2] mol % |
|---|---|---|---|---|---|---|
| Example 1 | 2-(acryloyloxy)ethyl methacrylate | methyl acrylate | 1.5 | 2.3 | 0.9 | 7.7 |
| Example 2 | 2-(acryloyloxy)ethyl methacrylate | methyl acrylate | 1.2 | 2.1 | 0.7 | 8.8 |
| Example 3 | 2-(acryloyloxy)ethyl methacrylate | methyl acrylate | 0.6 | 1.6 | 1.0 | 16.7 |
| Example 4 | 2-(acryloyloxy)ethyl methacrylate | n-butyl acrylate | 1.1 | 1.8 | 0.4 | 10.7 |
| Example 5 | 2-(acryloyloxy)ethyl methacrylate | n-butyl acrylate | 0.8 | 1.7 | 0.3 | 11.8 |
| Comparative Example 1 | 2-(acryloyloxy)ethyl methacrylate | — | 9.0 | 2.3 | 0.5 | — |
| Comparative Example 2 | — | methyl acrylate | 12.2 | 6.8 | — | 7.5 |
| Comparative Example 3 | — | methyl acrylate | 7.4 | 6.3 | — | 7.5 |
| Comparative Example 4 | — | methyl acrylate | 12.9 | 6.9 | — | 9.8 |

| | Melting point °C | Degree of methyl branching 1/1000 C. | Solubility MMA min | Toluene min | Ethyl acetate min | ODCB min |
|---|---|---|---|---|---|---|
| Example 1 | 84.0 | 0.6 | 1 | 5 | 25 | 5 |
| Example 2 | 78.5 | 0.5 | 1 | ND | ND | ND |
| Example 3 | — | <0.1 | 2 | 1 | 2 | 2 |
| Example 4 | — | 0.7 | 1 | 1 | 2 | 1 |
| Example 5 | — | 0.4 | 1 | 1 | 2 | 1 |
| Comparative Example 1 | 124.2 | 1.1 | >30 | >60 | >60 | 50 |
| Comparative Example 2 | 77.0 | ND | 23 | 5 | 45 | 30 |
| Comparative Example 3 | 75.0 | ND | 15 | 5 | 30 | 25 |
| Comparative Example 4 | 68.0 | ND | 15 | 5 | 30 | 25 |

In the table, "ND" means no determination.

As shown in Table 1, it has become clear that the multi-component polar olefin copolymers of Examples have equal or higher solubility in various solvents as compared with the copolymers of Comparative Examples and exhibit good solubility.

The present invention is not limited to the embodiments detailed above, and various modifications or changes are possible within the scope shown in Claims of the present invention.

While the invention has been described in detail and with reference to specific embodiments thereof, it will be apparent to one skilled in the art that various changes and modifications can be made therein without departing from the spirit and scope thereof. The present application is based on Japanese Patent Application No. 2017-062302 filed on Mar. 28, 2017, and the contents are incorporated herein by reference.

INDUSTRIAL APPLICABILITY

According to the present invention, there is provided a novel multi-component polar olefin copolymer having a linear polymer primary structure. This is a novel olefin copolymer having a polymerizable functional group, in which the solvent solubility is sufficiently improved without impairing mechanical properties and other physical properties. Accordingly, the multi-component polar olefin copolymer of the present invention can be used in a wide range of uses and has high industrial applicability.

The invention claimed is:

1. A multi-component polar olefin copolymer comprising:

one kind of unit of nonpolar monomer (X1) that is ethylene or an α-olefin having 3 to 10 carbon atoms; and one or two or more kinds of units of polar monomers (Z1) that are a compound represented by the following general formula (1), wherein the multi-component polar olefin copolymer comprises at least any one structural unit of one or two or more kinds of units of nonpolar monomers (X2) that are different from the nonpolar monomer (X1) and are selected from the group consisting of ethylene and an α-olefin having 3 to 10 carbon atoms; and one or two or more kinds of units of polar monomers (Z2) that are a compound represented by the following general formula (2), wherein the multi-component polar olefin copolymer has a ratio (Mw/Mn) of 1.5 to 3.5, which is a ratio of weight-average molecular weight (Mw) to number-average molecular weight (Mn), as determined by gel permeation chromatography (GPC):

$$H_2C=CH-COO-(Q)-T1 \quad \quad \quad 1$$

$$H_2C=CH-T2 \quad \quad \quad 2$$

wherein, in the general formula (1),

Q represents a divalent hydrocarbon group having 2 to 10 carbon atoms, a divalent hydrocarbon group having 2 to 10 carbon atoms, which is substituted with a hydroxyl group, a divalent hydrocarbon group having 3 to 20 carbon atoms, which is substituted with an alkoxy group having 1 to 10 carbon atoms, a divalent hydrocarbon group having 4 to 20 carbon atoms, which is substituted with an ester group having 2 to 10 carbon atoms, a divalent hydrocarbon group having 5 to 28 carbon atoms, which is substituted with a substituted silyl group having 3 to 18 carbon atoms, a divalent hydrocarbon group having 2 to 10 carbon atoms, which is substituted with an ether group, or a divalent hydrocarbon group having 2 to 10 carbon atoms, which is substituted with a halogen atom, and T1 represents a methacryloyloxy group;

in the general formula (2),

T2 represents a hydrocarbon group having 1 to 10 carbon atoms, which is substituted with a hydroxyl group, a hydrocarbon group having 2 to 20 carbon atoms, which is substituted with an alkoxy group having 1 to 10 carbon atoms, a hydrocarbon group having 3 to 20 carbon atoms, which is substituted with an ester group having 2 to 10 carbon atoms, a hydrocarbon group having 4 to 28 carbon atoms, which is substituted with a substituted silyl group having 3 to 18 carbon atoms, a hydrocarbon group having 1 to 10 carbon atoms, which is substituted with a halogen atom, an alkoxy group having 1 to 10 carbon atoms, an aryloxy group having 6 to 20 carbon atoms, a carboxyl group, an ester group having 2 to 10 carbon atoms, an acyloxy group having 2 to 10 carbon atoms, an amino group, a substituted amino group having 1 to 12 carbon atoms, a substituted silyl group having 3 to 18 carbon atoms, or a halogen atom.

2. The multi-component polar olefin copolymer according to claim 1, which has a degree of methyl branching of 5.0 or less per 1,000 carbons of the main chain, which is calculated by $^{13}$C-NMR.

3. The multi-component polar olefin copolymer according to claim 1, wherein the copolymer is formed by polymerization using a transition metal catalyst of a metal of Group-5 to Group-10 of the periodic table.

4. The multi-component polar olefin copolymer according to claim 3, wherein the transition metal catalyst is a transition metal catalyst which contains nickel metal or palladium metal, and a chelatable phosphine compound coordinated thereto.

5. A method for producing the multi-component polar olefin copolymer according to claim 1, comprising copolymerizing X1, X2, Z1, and Z2 in the presence of a transition metal catalyst of a metal of Group-5 to Group-10 of the periodic table.

6. The method for producing the multi-component polar olefin copolymer according to claim 5, wherein the transition metal catalyst is a transition metal catalyst which contains nickel metal or palladium metal, and a chelatable phosphine compound coordinated thereto.

* * * * *